April 17, 1945.  C. B. MOORE  2,374,154
COMPARATOR GAUGE
Filed May 14, 1942  3 Sheets-Sheet 2
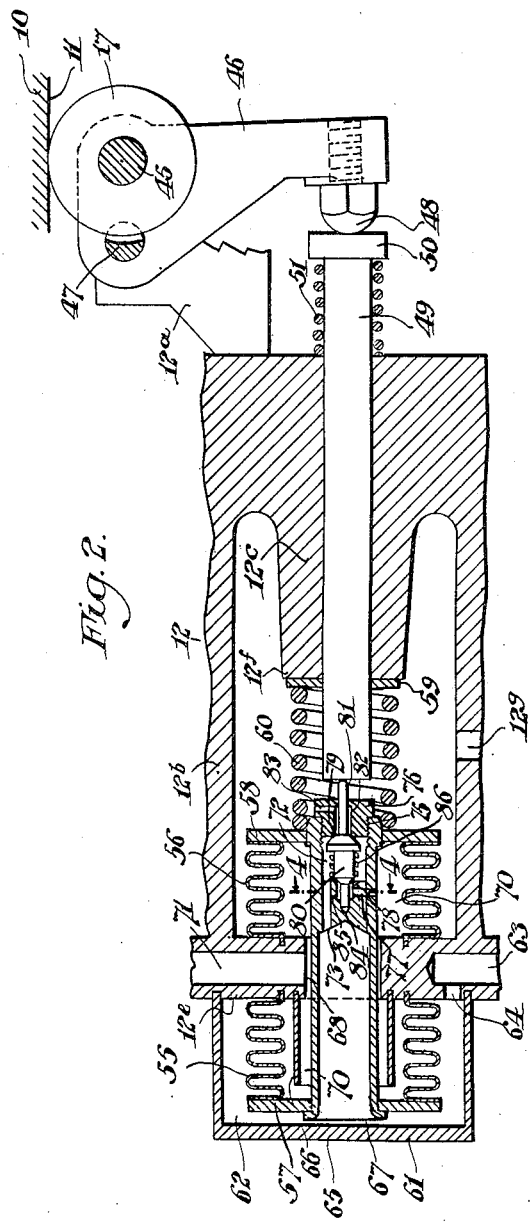
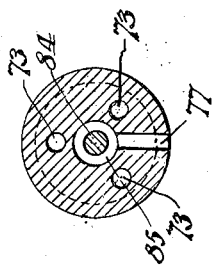
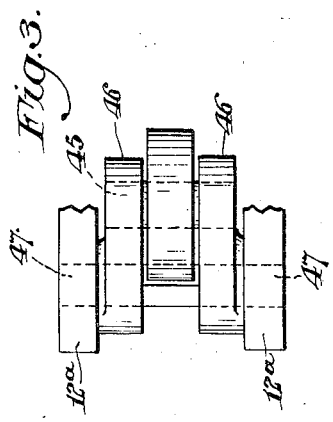
Inventor:
Coleman B. Moore,
By Z. T. Wolaramith
Attorney.

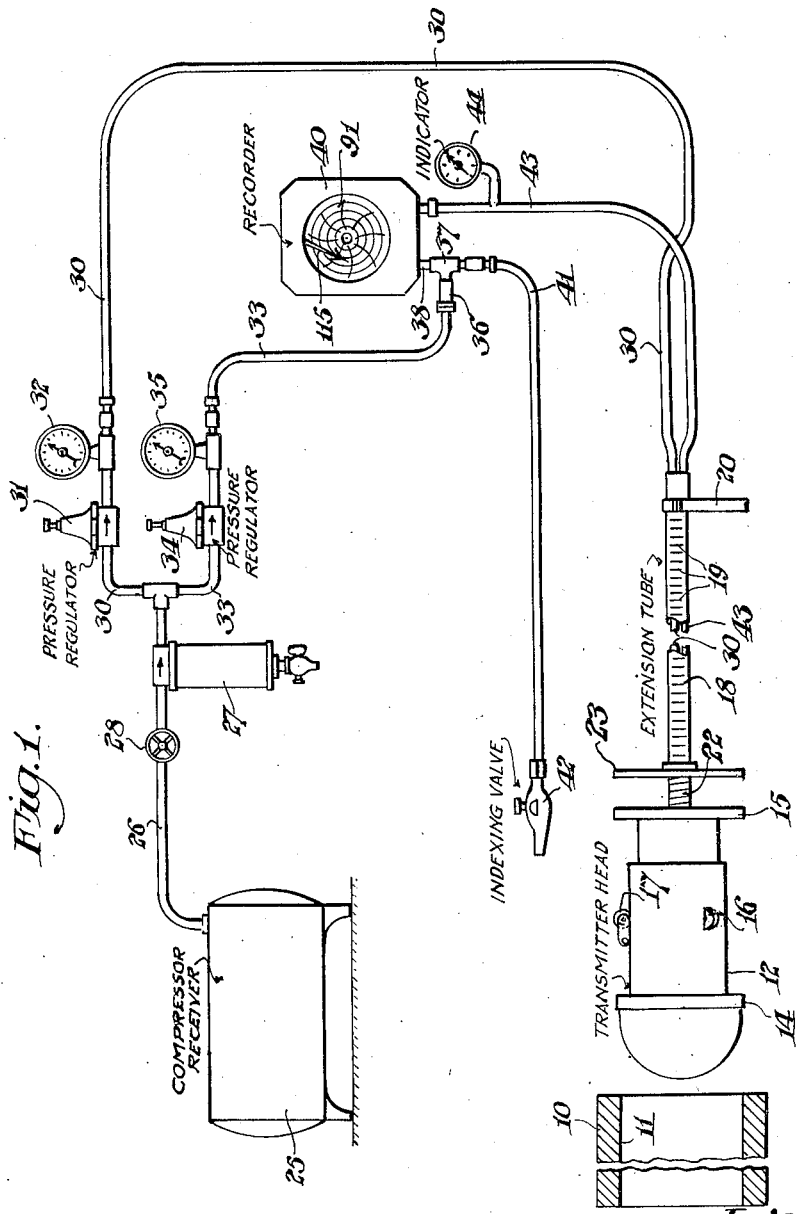

April 17, 1945.  C. B. MOORE  2,374,154
COMPARATOR GAUGE
Filed May 14, 1942   3 Sheets-Sheet 3

Inventor:
Coleman B. Moore,
By J. T. Wobensmith
Attorney.

Patented Apr. 17, 1945

2,374,154

UNITED STATES PATENT OFFICE 2,374,154

COMPARATOR GAUGE

Coleman B. Moore, Carroll Park, Pa., assignor to Moore Products Co., Philadelphia, Pa., a co-partnership Application May 14, 1942, Serial No. 442,953

17 Claims. (Cl. 33—178)

This invention relates to comparator gauges, and more particularly to a pneumatic gauge for recording dimensions, and which is adapted for a variety of purposes.

Dimension gauges heretofore available have not been equipped for making an accurate and permanent record of readings, particularly where the work has an internal bore of substantial length to be gauged.

It is the principal object of the present invention to provide an improved comparator gauge with which a record may be readily made of dimensions at a succession of locations.

It is a further object of the present invention to provide a comparator gauge which is particularly suited for gauging internal bores at a plurality of locations along the bore and recording the dimensions at the respective locations.

It is a further object of the present invention to provide a comparator gauge in which a pressure is transmitted which is directly proportional to a particular dimension.

It is a further object of the present invention to provide a comparator gauge by which a permanent record of dimensions may be made and with which a comparison with master gauges may be incorporated on the record.

Other objects of the invention will be apparent from the annexed specification and claims.

The nature and characteristic features of the invention will be more readily understood from the following description, taken in connection with the accompanying drawings forming part hereof, in which Figure 1 is a diagrammatic view of a comparator gauges in accordance with the present invention;

Fig. 2 is a fragmentary vertical central sectional view through a portion of the transmitter head;

Fig. 3 is a fragmentary horizontal plan view of a portion of Fig. 2 showing the follower roller and the mounting therefor;

Fig. 4 is an enlarged transverse vertical sectional view taken approximately on the line 4—4 of Fig. 2;

Figure 6:
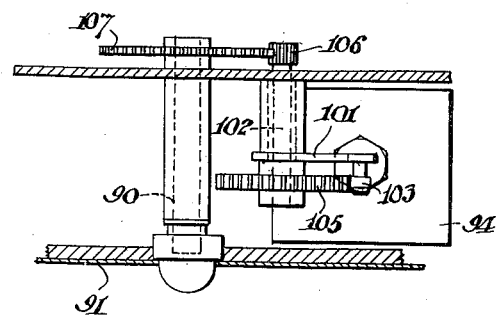
Fig. 6 is a horizontal sectional view taken approximately on the line 6—6 of Fig. 5.

It will, of course, be understood that the description and drawings herein are illustrative merely, and that various modifications and changes may be made in the structure disclosed without departing from the spirit of the invention.

Referring more particularly to Fig. 1 of the drawings, a preferred embodiment of the invention is illustrated diagrammatically. One form of work for which the gauge is particularly adapted shown at 10, and consists of a long tube having an internal bore 11, which is to be measured. Although the work 10 is illustrated as greatly reduced in length, it may have a length of the order of a hundred or more times the diameter of the internal bore 11.

The gauge includes a transmitter head 12 having a pressure transmitter therein, hereinafter described in detail. The transmitter head 12 has a forward guide and support 14, and a guide and support 15 of any preferred character to function at the innermost end of the work, such for example, as spaced rings on the periphery and of sufficiently smaller diameter than that of the work so as not to jam or bind. The transmitter head 12 is preferably provided intermediate its ends with a two point support at the lower part consisting of lower supporting rollers 16. An upper movable roller 17 is provided and constitutes a gauge roller to follow the internal surface of the work to be gauged and is movable as hereinafter pointed out.

The transmitter head 12 is mounted by means of a flexible connection 22, on the end of a rigid extension tube 18, suitably marked in inches or other desired divisions as at 19, in accordance with the length of the work to be gauged and the character of record desired. A limit disc 23 is provided so that misalinement of the extension tube 18 is not transferred to the transmitter head 12 but is taken up by the flexible connection 22. A limit stop 20 may be provided at the outer end of the extension tube 18 to limit the extent of insertion of the transmitter head 12 within the work.

An air compressor or other suitable source of pressure fluid is provided, connected to a receiver 25, and a delivery line 26 is connected from the receiver 25 to a filter and drip well 27 for filtering the pressure fluid and removing moisture and dirt therefrom. A manual shut-off valve 28 may be provided in the delivery line 26.

A transmitter supply line 30 is connected to the outlet side of the filter 27, and a fluid pressure regulator 31 is connected in the transmitter supply line 30 for maintaining a pressure regulated supply of fluid for delivery through the transmitter supply pipe 30, and through the interior of the extension tube 18 to the transmitter head 12. A pressure gauge 32 may be provided in the transmitter supply pipe 30 for indicating the pressure of the fluid therein.

A recorder indexing supply pipe 33 is provided, and is connected to the outlet side of the filter 27. A fluid pressure regulator 34 is connected in the supply pipe 33 for maintaining a pressure regulated supply of fluid for delivery through the supply pipe 33. The pressure regulator 34 may be adjusted for the same delivered pressure as the pressure regulator 31, or for some other predetermined pressure, and a pressure gauge 35 may be provided in the supply pipe 33 for indicating the pressure of the fluid therein.

The supply pipe 33 is connected through an orifice or other restriction 36 to a branch connection or T 37, from one branch of which a pipe 38 is connected to a recorder 40, and to the other branch of which a pipe 41 is connected.

An indexing release valve 42 is provided on the end of the pipe 41 for manual release of the pressure in the pipes 38 and 41, and on the discharge side of the orifice 36, in the manner and for purposes hereinafter explained. The recorder 40 also has a pipe 43 connected thereto for the delivery of pressure fluid from the pressure transmitter in the transmitter head 12 and through the interior of the extension tube 18. An indicator 44 may also be connected to the pipe 43 for visible or audible indication.

In Figs. 2, 3 and 4, certain details of structure of the transmitter head 12 are illustrated, parts which are not requisite to an understanding of the operation having been omitted. As indicated above, the transmitter head 12 has a gauge roller 17 mounted therein, the gauge roller 17 preferably being carried on a spindle 45 mounted on a lever arm 46. The lever arm 46 is mounted on alined spindles 47 carried in fixed portions 12a of the transmitter head 12. The lower end of the lever arm 46 has a contact member 48 for engagement with an actuator rod 49 slidable within another fixed portion 12b of the transmitter head 12. The distance between the contact member 48 and the gauge roller 17 is preferably greater than the distance between the gauge roller 17 and the spindle 47 for magnification of the variation in positioning of the gauge roller 17.

The actuator rod 49 is supported in any desired manner such as by a guide 12c. The actuator rod 49 has a flange 50 thereon, and a spring 51 is interposed between the fixed portion 12d and the flange 50 for imparting a bias to the rod 49, and therefrom through the contact member 48, and the lever arm 46 to the gauge roller 17.

The pressure transmitter in the transmitter head 12 may be of any desired type, but is preferably of the follow-up or rebalancing type, and includes flexible metallic bellows 55 and flexible metallic bellows 56 secured in fluid-tight relationship to and on opposite sides of a fixed portion 12e of the transmitter head 12. The bellows 55 is closed at the other end by a plate 57 secured to the bellows 55 in fluid-tight relationship, and the bellows 56 is closed at its other end by a plate 58 secured thereto in fluid-tight relationship. The bellows 55 and 56 have the same internal area so that variations in the supply pressure acting therein are compensated. A spring 60 having linear expansion characteristics is provided between the bellows plate 58 and the forward end of the fixed portion 12f. A washer 59 may be interposed between the end of the spring 60 and the portion 12f, and washers 59 of different thicknesses may be employed for shifting the zero of the transmitted pressure. A casing 61 is secured to the fixed portion 12e of the transmitter head 12, and encloses the bellows 55 to provide a fluid pressure chamber 62. A bore 63 in the fixed portion 12e is in communication with this chamber through an opening 64, and the pipe 43 is connected thereto.

The end 65 of the casing 61 serves as a limit stop for the bellows plate 57 in one direction, and a sleeve 66 serves as a limit stop in the other direction.

The bellows plates 57 and 58 are spaced by a connector 67, which is secured at its forward end to the bellows plate 57, extends through an opening 68 in the fixed portion 12e, and is secured at its rear end to the bellows plate 58, in fluid-tight relationship. A fluid pressure chamber 70 is thus provided within the bellows 55 and the bellows 56, and a bore 71 in the fixed portion 12e is in communication with this chamber 70. The line 30 is connected to the bore 71. The connector 67 is open at its forward end adjacent the bellows plate 57 and in communication with the chamber 62, and is in communication through openings 73 with the chamber 72. The rear end of the connector 67 carries an exhaust seat member 75, having a head 76, and threaded into the connector 67. The pilot valve chamber 72, in the connector 67, has a forward valve seat 78. The inner end of the exhaust seat member 75 has a rear valve seat 79 spaced from the forward valve seat 78. A pilot valve 80 is mounted within the pilot valve chamber 72 for alternative engagement with one or the other of said seats 78 and 79, or for positioning therebetween as hereinafter pointed out. The pilot valve 80 has an actuator stem 81 which extends through an opening 82 in the plug 75 and through the head 76. The opening 82 within a portion of the plug 75 is larger than the stem 81 to permit the discharge of pressure fluid therealong, and through a discharge opening 83 in the head 76 in communication with the atmosphere, when the pilot valve 80 is moved away from the rear valve seat 79.

The pilot valve 80 also has a guide stem 84 for longitudinal movement in a guide bore in the connector 67. The portion of the guide bore adjacent the forward valve seat 78 is enlarged as at 85, and the ports 77 extend between this enlargement 85 and the space 70 within the bellows 55 and 56. A spring 86 normally tends to move the pilot valve 80 into engagement with the seat 79.

Upon movement of the pilot valve 80 towards the left, the delivery of fluid from the chamber 70, through the bore 77 and the enlargement 85 to the pilot valve chamber 72, is cut off or reduced by the positioning of the pilot valve 80 with respect to the forward valve seat 79. This movement of the pilot valve 80 likewise opens or increases the spacing of the pilot valve 80 with respect to the rear valve seat 78 so that fluid is permitted to escape through the bore 82 and the opening 83 from the pilot valve chamber 72. A discharge vent 12g may be provided in communication with the atmosphere. The controlled discharge of fluid by the pilot valve 80 under these conditions also permits the discharge of fluid from the chamber 62, and the pressure in the chamber 62 is reduced. The reduction in pressure in the chamber 62 decreases the force tending to move the bellows unit including the bellows 55 and 56 towards the right. The resilient force exerted by the spring 60, and the bellows 55 and 56, causes the bellows unit to move towards the left and to a new position with respect to the pilot valve 80. In this new position the forces exerted by the spring 60 and the bellows 55 and 56 are balanced against the force exerted by the reduced equilibrium pressure in the chamber 62.

If the pilot valve moves towards the right, the discharge of fluid through the bore 82 and the opening 83 is reduced or shut off, and the opening between the pilot valve 80 and the valve seat 78 is increased. This positioning of the pilot valve 80 permits increased flow of fluid through the bore 77, the enlargement 85, and into the chamber 72. An increased pressure is thus built up in the chamber 72 and is effective through the open end of the connector 67 and in the chamber 62 for moving the bellows unit towards the right and to a new position with respect to the pilot valve 80. In this new position the forces exerted by the spring 60 and the bellows 55 and 56 are balanced against the force exerted by the increased equilibrium pressure in the chamber 62.

It will be noted that the bellows unit, including the bellows 55 and 56 and the connector 67, follow the positioning of the pilot valve 80 in whichever direction the pilot valve 80 is moved. This follow-up action occurs quickly and does not require any substantial interval of time.

The movement of the pilot valve 80 may be made very small and of the order of a few thousandths of an inch, and this movement and the size of the ports controlled by the pilot valve 80 may be varied as desired to obtain a suitable speed of response in transmission to the recorder 40 and the indicator 44.

The equilibrium or rebalancing pressure within the chamber 62 is available for transmission through the opening 64, the bore 63 and the pipe 43 to the recorder 40 and the indicator 44 and is quickly achieved.

Figure 5:
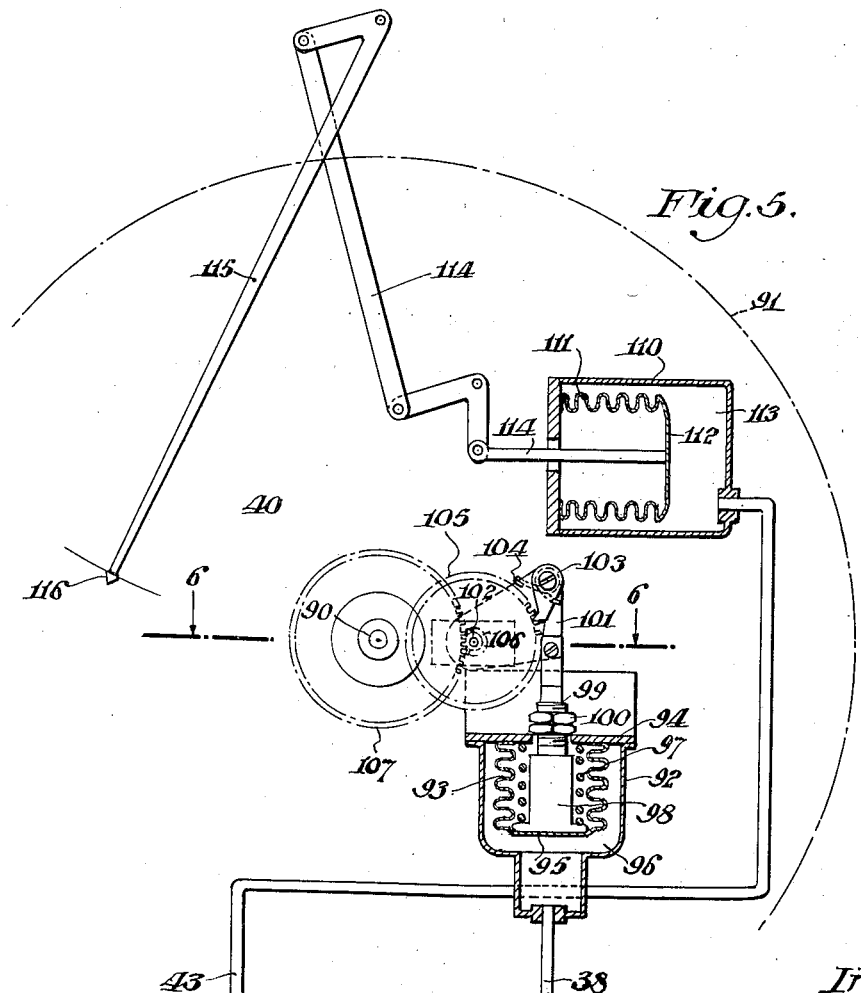
Fig. 5 is a fragmentary view partly in section and partly in elevation of a recorder for use in connection with the present invention.

In Figs. 5 and 6, certain details of the recorder 40 are illustrated, parts not requisite to an understanding of the invention having been omitted. The recorder 40 includes the customary spindle 90 upon which a chart 91 is mounted for movement upon rotation of the spindle 90. The spindle 90 is preferably actuated with a controlled step by step movement, and for this purpose, a casing 92 is provided to which the pipe 38 is connected. The casing 92 preferably has a flexible metallic bellows 93 therein, the bellows 93 being connected at its upper end in fluid-tight relationship to a supporting plate 94 and closed at its lower end 95. A fluid pressure chamber 96 is thus provided outside the bellows 93. Within the bellows 93, a spring 97 is provided in engagement with a spring seat and limit stop 98. The seat member 98 has a threaded arm 99 extending upwardly therefrom with stop nuts 100 carried thereon. A ratchet plate 101 is provided, pivotally mounted on the spindle 102, and a ratchet 103 is carried on the plate 101. The ratchet plate 101 is connected to the arm 99 for actuation upon movement of the bellows 93 as hereinafter pointed out. The ratchet 103 is urged in a clockwise direction by a spring 104 and adapted to engage the teeth of a ratchet gear 105 carried on the spindle 102 and connected thereto, the spindle 102 also having a pinion 106 fixed thereon for engagement with a gear 107 carried on and actuating the chart spindle 90. The bellows 93 and the parts actuated thereby are shown in a released pressure position and as actuated downwardly by the spring 97.

A casing 110 is also provided within the recorder 40, and a flexible metallic bellows 111 is mounted therein. The bellows 111 is secured to the end of the casing 110 in fluid-tight relationship, and its other end closed by a plate 112 to provide a pressure chamber 113, within the casing 110, and outside the bellows 111. The pipe 43 is connected to the chamber 113. The bellows closure plate 112 is connected through suitable linkage 114, of any desired type, to a pen arm 115 having a pen 116 thereon for making a line record on the chart 91. The pen 116 will thus be positioned in accordance with the pressure prevailing in the chamber 113. The chart may be divided in any desired manner, but in one preferred embodiment the chart 91 and the pen movement are proportioned so that fifty-thousandths of an inch are represented by approximately four and one-half inches of pen travel considered radially on the chart.

The mode of operation of the comparator gauge will now be pointed out.

Pressure fluid is supplied by the compressor to the receiver 25 and through the supply pipe 26 and the filter 27 to each of the pressure regulators 31 and 34. The fluid supplied through the pipe 30 to the transmitter head 12 is delivered through the bore 71 to the fluid pressure chamber 70, and through the ports 77 to the enlargement 85. The delivery of fluid to the pilot valve chamber 72 is determined by the positioning of the pilot valve 80 with respect to the forward valve seat 78. The pressure of the fluid in the pilot valve chamber 72 is also determined by the positioning of the pilot valve 80 with respect to the rear valve seat 79, since by the latter the discharge of fluid is controlled. The pressure effective in the pilot valve chamber 72 is also effective through the bores 73, the hollow portion of the connector 67, and the fluid pressure chamber 62. The pressure of the fluid in the chamber 62 is also effective through the opening 64, the bore 63, the pipe 43, and in the chamber 113 of the recorder 40. In the recorder 40 the pressure effective in the chamber 113 is operative for positioning the bellows 111 and thereby the recording pen 116.

The actuation of the pilot valve 80 is effected by the positioning of the gauge roller 17. The gauge roller 17 actuates the lever arm 46, and this positions the actuator rod 49, against the force of the spring 51. The movement of the rod 49 is effective on the pilot valve actuator 81 and the unit which includes the bellows 55 and 56, the plates 57 and 58, and the connector 67 move to an equilibrium and balanced position determined by the pressure effective in the chamber 62.

The chart 91 of the recorder 40 is preferably advanced in a step by step movement to correspond to the step by step advance of the transmitted head 12 in accordance with the markings 19 on the extension tube 18. The advance of the chart 91 is accomplished by momentarily pressing the indexing release valve 42, and upon such advance a line is drawn on the chart 91 by the pen 116, in accordance with the positioning of the pen 116, by the pressure in the chamber 113 acting on the bellows 111. The bellows 93 is normally compressed by the pressure in the chamber 96, and the ratchet 103 is thus in a position to move downwardly in engagement with the ratchet wheel 105 when desired. The pressure in the pipe 38 and in the chamber 96 is released to the atmosphere by pressing the indexing release valve 42.

Upon the release of the pressure in the chamber 96, the spring 97 moves the arm 99 downwardly, and this movement through the plate 101, and the ratchet 103 causes rotation of the ratchet gear 105 through a predetermined angular movement. The movement of the gear 105 is effective through the spindle 102, the pinion 106, and the gear 107 on the chart spindle 90 for rotating the chart 91 through the desired angle so that a line is inscribed by the pen 116 on the chart 91 in accordance with the positioning of the pen 116 by the pressure in the chamber 113.

In the gauging of the work, it is preferable to first make a record on the chart 91 with master ring gauges using both the maximum and minimum ring gauges. These gauges are successively brought into engagement respectively with the rollers 16 and 17 thereof. The dimensions of these master gauges will then be recorded on the chart 91 as a permanent record.

The transmitter head 12 is then inserted into the work 10 a distance corresponding to one marking 19 on the extension tube 18, and the indexing release valve 42 is operated once. The transmitter head 12 is then inserted step by step, preferably in accordance with the markings 19 on the extension tube 18, and the indexing release valve 42 is operated once at the conclusion of each step of insertion. The dimensions at each spaced interval within the bore 11 will thus be recorded on the chart 91. At the conclusion of the exploratory record, the master ring gauges are then preferably again applied to the rollers 16 and 17, and the record thereof on the chart 91 will thus provide an absolute check on the measurements throughout the entire length of the bore 11. The chart 91 with the record thereon may be removed from the recorder 40 and filed as a full inspection report on the internal measurements of the work.

A magnification of the dimensional position of the gauge roller 17 is obtained by the use of the pivotal mounting shown and also by the use of a transmitted pressure.

It will be understood that the gauge of the present invention is not limited to the indicating or recording of internal dimensions. The gauge roller 17, or similar dimension responsive element in a suitable mounting, could be readily employed for measurement of other deviations of dimensions and for indicating or for recording the same to provide a permanent record of the dimensional characteristics of the work.

I claim:

1. In a comparator gauge, a body member, a gauge member mounted on said body member and positioned by the dimensions of the work being gauged, means responsive to the positioning of said gauge member for transmitting a gaseous control pressure, an indicator operated by said control pressure, a dimension recorder having a movable chart over which said indicator is movable, and manually controlled fluid pressure actuated means for advancing said chart.

2. In a dimension gauge, a body member, a gaseous fluid pressure transmitter carried by said body member and responsive to dimensional variations of the work being gauged, means including an indicator actuated from said fluid pressure transmitter and a chart over which said indicator is movable for recording said dimensional variations, and fluid pressure operated members for advancing the chart step by step, whereby the dimensional variation is continuously recorded.

3. In a pnuematic dimension gauge, a body member, a gauge member thereon positioned by the dimensions of the work being gauged, a gaseous fluid pressure transmitter having a transmitted pressure controlling floating pilot valve actuated by said gauge member, and a recorder having a record chart, said recorder including indicator means responsive to gaseous pressure transmitted by said fluid pressure transmitter and movable over said chart for recording the dimensions of the work on said chart.

4. In a pneumatic dimension gauge, a body member, a movable gauge member carried thereby and positioned by the dimensions of the work being gauged, a gaseous fluid pressure transmitter having a transmitted pressure controlling floating pilot valve actuated by said gauge member, an indicator responsive to gaseous pressure transmitted by said transmitter, a recorder having a record chart over which said indicator operates, and manually controlled actuating means for advancing said record chart.

5. In a pneumatic dimension gauge, a body member, a movable gauge member carried by said body member and positioned by the dimensions of the work being gauged, a gaseous fluid pressure transmitter having a floating pilot valve for controlling a transmitted gaseous pressure, said pilot valve being actuated by movement of said gauge member, and an indicator spaced from said body member and responsive to the transmitted gaseous pressure.

6. In a dimension gauge, a gauge member positioned by contact with the work being gauged, an elongated support for said gauge member having dimension markings longitudinally spaced thereon, a gaseous fluid pressure transmitter having a movable control portion actuated by said gauge member, an indicator responsive to the gaseous pressure transmitted by said pressure transmitter, a recorder having a chart over which said indicator is movable, and manually operated positioning means for said chart for positioning the same to correspond to the aforesaid dimension markings.

7. In a dimension gauge, a body member, a gauge member carried by said body member and positioned by contact with the work being gauged, a support for said gauge member having dimension markings longitudinally spaced thereon, a gaseous fluid pressure transmitter actuated by said gauge member and having a portion movable in response to fluid pressure and to the positioning of said gauge member, a recorder having an indicating member responsive to the pressure transmitted by said pressure transmitter and having a record chart over which said indicating member is movable, and manually controlled positioning means for said record chart for positioning the same to correspond to the aforesaid dimension markings.

8. In a dimension gauge, a body member, a gauge member carried by said body member and positioned by contact with the work being gauged, an elongated support extending from said body member having dimension markings longitudinally spaced thereon, a fluid pressure transmitter having a movable portion and a floating pilot valve carried by said portion and actuated by said gauge member, said movable portion being positioned in accordance with the positioning of said pilot valve, and an indicator actuated by the transmitted pressure 9. In a dimension gauge, a body member, a gauge member carried by said body member and poistioned by the dimensions of the work being gauged, and a gaseous fluid pressure transmitter carried by said body member for transmitting a gaseous fluid pressure in accordance with the positioning of said gauge member, said fluid pressure transmitter having a gaseous pressure responsive wall portion, and a pilot valve carried by said wall portion and actuated by said gauge member for controlling said transmitted pressure.

10. In a dimension gauge, a body member, a gauge member carried by said body member and responsive to the dimensions of the work being gauged, and a gaseous fluid pressure transmitter carried by said body member for transmitting a gaseous fluid pressure in accordance with the positioning of said gauge member, said pressure transmitter including a freely movable pilot valve actuated by said gauge member for controlling said transmitted gaseous pressure.

11. In a pneumatic dimension gauge, a body member, a pivotally mounted gauge member carried by said body member and positioned by contact with the work being gauged, a gaseous fluid pressure transmitter carried by said body member having a freely movable pilot valve actuated by said gauge member for controlling the transmission of gaseous fluid pressure, a recorder having an indicating member responsive to the fluid pressure transmitted by said pressure transmitter and having a record chart on which said indicating member is movable, and selectively operated positioning means for said record chart.

12. In a dimension gauge, a gauge member positioned by contact with the work, an elongated support for said gauge member having dimension markings longitudinally spaced thereon, a gaseous fluid pressure transmitter having a movable control portion actuated by said gauge member, a recorder having an indicator responsive to the pressure transmitted by said pressure transmitter and a chart on which said indicator is movable, and manually operated fluid pressure actuated positioning means for said recorder for positioning the same to correspond to the aforesaid dimension markings.

13. In a dimension gauge, a body member, a gauge member carried thereby and positioned by the dimensions of the work being gauged, means responsive to the positioning of said member for transmitting a control pressure, said transmitting means including an expansible chamber having a movable element and a pilot valve carried by said movable element and actuated by said gauge member for controlling the pressure conditions in said chamber for transmission as the control pressure, said movable element being positioned by pressure in accordance with the positioning of said pilot valve, an indicator operated by said control pressure, a dimension recorder having a movable chart over which said indicator is movable, and manually controlled pressure actuated means for advancing said chart.

14. In a dimension gauge, a body member, a gauge member carried thereby and positioned by the dimensions of the work being gauged, means responsive to the positioning of said member for transmitting a gaseous control fluid pressure, said transmitting means including an expansible chamber having an element movable in response to changes in gaseous fluid pressure and a pilot valve carried by said movable element and actuated by said gauge member for controlling the pressure conditions in said chamber for transmission as the control pressure, an indicator operated by said control pressure, a dimension recorder having a movable chart over which said indicator is movable, and manually controlled pressure actuated means for advancing said chart.

15. In a dimension gauge, a body member, a gauge member carried thereby and positioned by the dimensions of the work being gauged, and means responsive to the positioning of said gauge member for transmitting a gaseous control fluid pressure, said transmitting means including an expansible chamber, a movable element forming part of said chamber and movable in response to changes in gaseous fluid pressure in said chamber, a freely movable pilot valve carried by said movable element and actuated by said gauge member for controlling the pressure effective on said member in said chamber, and connections for transmitting the pressure in said chamber as a control pressure.

16. In a dimension gauge, a body member, an elongated support for said body member, a gauge member carried by said body member and positioned by the dimensions of the work being gauged, means responsive to the positioning of said gauge member for transmitting a gaseous control fluid pressure, said transmitting means including a chamber in said body member, a movable element forming part of said chamber and movable in response to changes in gaseous fluid pressure in said chamber, a pilot valve carried by said movable element and actuated by said gauge member for controlling the pressure effective on said member in said chamber, and connections extending through said elongated support for transmitting the pressure in said chamber as a control pressure.

17. In a dimension gauge, a body member, a gauge member carried by said body member, means for transmitting a gaseous control pressure in accordance with the positioning of said gauge member, said transmitting means including an expansible chamber having a movable portion positioned by the transmitted gaseous pressure in accordance with the position of said gauge member, and connections for transmitting the pressure in said chamber as a control pressure.

COLEMAN B. MOORE.